United States Patent
Zhuang et al.

(10) Patent No.: US 9,485,061 B2
(45) Date of Patent: Nov. 1, 2016

(54) COMMUNICATION SYSTEM WITH FLEXIBLE REPEAT-RESPONSE MECHANISM AND METHOD OF OPERATION THEREOF

(71) Applicant: Samsung Electronics Co., Ltd., Gyeonggi-Do (KR)

(72) Inventors: Hairuo Zhuang, San Diego, CA (US); Vignesh Sethuraman, La Jolla, CA (US); Shahab Sanayei, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 160 days.

(21) Appl. No.: 13/941,930

(22) Filed: Jul. 15, 2013

(65) Prior Publication Data
US 2014/0105127 A1  Apr. 17, 2014

Related U.S. Application Data

(60) Provisional application No. 61/713,417, filed on Oct. 12, 2012.

(51) Int. Cl.
 *H04L 1/18* (2006.01)
 *H04L 1/00* (2006.01)
 *H04L 1/16* (2006.01)
(52) U.S. Cl.
 CPC ......... *H04L 1/1861* (2013.01); *H04L 1/0045* (2013.01); *H04L 1/0057* (2013.01); *H04L 1/1671* (2013.01); *H04L 1/1887* (2013.01)
(58) Field of Classification Search
 None
 See application file for complete search history.

(56) References Cited

U.S. PATENT DOCUMENTS

| | | | | |
|---|---|---|---|---|
| 6,145,108 | A * | 11/2000 | Ketseoglou | 714/751 |
| 6,222,835 | B1 * | 4/2001 | Franz et al. | 370/349 |
| 6,240,094 | B1 * | 5/2001 | Schneider | 370/412 |
| 6,377,562 | B1 * | 4/2002 | Schneider | 370/330 |
| 6,522,635 | B1 * | 2/2003 | Bedwell | 370/314 |
| 6,615,382 | B1 * | 9/2003 | Kang et al. | 714/748 |
| 6,907,005 | B1 * | 6/2005 | Dahlman et al. | 370/236 |
| 7,499,674 | B2 * | 3/2009 | Salokannel et al. | 455/69 |

(Continued)

FOREIGN PATENT DOCUMENTS

| | | |
|---|---|---|
| KR | 20060016022 A | 11/2003 |
| WO | 2011005521 A2 | 1/2011 |

OTHER PUBLICATIONS

Comroe, R. and Costello, Jr., D.J., "ARQ Schemes for Data Transmission in Mobile Radio Systems", Selected areas in Communications, IEEE Journal on, vol. 2, issue 4, pp. 472-481.

(Continued)

*Primary Examiner* — Bunjob Jaroenchonwanit
(74) *Attorney, Agent, or Firm* — IP Investment Law Group

(57) ABSTRACT

A communication system includes: a message communication module configured to communicate a preceding data before a repeat request; a metric module, coupled to the message communication module, configured to determine a repeat metric associated with the repeat request for re-communicating the preceding data or a portion therein; and wherein the message communication module is further configured to communicate a repeat data including a repeat portion based on the repeat metric for re-communicating the preceding data or a portion therein for communicating with a device.

20 Claims, 4 Drawing Sheets

(56) References Cited

U.S. PATENT DOCUMENTS

| | | | |
|---|---|---|---|
| 7,697,948 B2 | 4/2010 | Wan et al. | |
| 7,813,322 B2 | 10/2010 | Laroia et al. | |
| 7,899,465 B1* | 3/2011 | Ivanov et al. | 455/456.1 |
| 7,907,906 B2* | 3/2011 | Murata et al. | 455/67.13 |
| 8,798,031 B2* | 8/2014 | Ishii | 370/350 |
| 8,942,208 B2* | 1/2015 | Luo et al. | 370/332 |
| 2003/0058851 A1* | 3/2003 | Goldman | 370/389 |
| 2003/0067899 A9* | 4/2003 | Chen et al. | 370/335 |
| 2003/0217319 A1* | 11/2003 | Tripathi et al. | 714/751 |
| 2005/0094667 A1* | 5/2005 | Dahlman et al. | 370/473 |
| 2005/0204252 A1* | 9/2005 | Aramaki et al. | 714/748 |
| 2005/0265246 A1* | 12/2005 | Farley et al. | 370/241 |
| 2005/0281212 A1* | 12/2005 | Jeong et al. | 370/310 |
| 2006/0036922 A1* | 2/2006 | Hong et al. | 714/748 |
| 2006/0184854 A1* | 8/2006 | Ihm et al. | 714/749 |
| 2007/0076679 A1* | 4/2007 | Lee | 370/348 |
| 2007/0104253 A1* | 5/2007 | Luo et al. | 375/148 |
| 2007/0298822 A1* | 12/2007 | Wan et al. | 455/509 |
| 2009/0017836 A1* | 1/2009 | Lee | 455/452.2 |
| 2009/0239525 A1* | 9/2009 | Cai et al. | 455/424 |
| 2009/0287456 A1* | 11/2009 | Tran et al. | 702/188 |
| 2009/0313519 A1* | 12/2009 | Nagaraja | 714/751 |
| 2010/0111036 A1* | 5/2010 | Iwamura | 370/331 |
| 2010/0146359 A1* | 6/2010 | Duan et al. | 714/750 |
| 2010/0278152 A1* | 11/2010 | Andreozzi et al. | 370/335 |
| 2010/0322177 A1* | 12/2010 | Luo et al. | 370/329 |
| 2011/0009143 A1* | 1/2011 | Kim et al. | 455/509 |
| 2011/0096852 A1* | 4/2011 | Kimura et al. | 375/259 |
| 2012/0028592 A1* | 2/2012 | Pick et al. | 455/130 |
| 2013/0039332 A1* | 2/2013 | Nazar et al. | 370/330 |
| 2013/0215858 A1* | 8/2013 | Jang et al. | 370/329 |
| 2013/0297996 A1* | 11/2013 | Wilborn et al. | 714/807 |
| 2013/0343273 A1* | 12/2013 | Barbieri et al. | 370/328 |
| 2014/0023030 A1* | 1/2014 | Jeong et al. | 370/329 |
| 2014/0146707 A1* | 5/2014 | Medapalli et al. | 370/254 |

OTHER PUBLICATIONS

Soljanin, E. et al., "Hybrid ARQ with Random Transmission Assignments", Advances in Network Information Theory, pp. 321-334.

* cited by examiner

COMMUNICATION SYSTEM WITH FLEXIBLE REPEAT-RESPONSE MECHANISM AND METHOD OF OPERATION THEREOF

CROSS-REFERENCE TO RELATED APPLICATION(S)

This application claims the benefit of U.S. Provisional Patent Application Ser. No. 61/713,417 filed Oct. 12, 2012, and the subject matter thereof is incorporated herein by reference thereto.

TECHNICAL FIELD

An embodiment of the present invention relates generally to a communication system, and more particularly to a system with flexible repeat-response mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a communication system with flexible repeat-response mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: a message communication module configured to communicate a preceding data before a repeat request; a metric module, coupled to the message communication module, configured to determine a repeat metric associated with the repeat request for re-communicating the preceding data or a portion therein; and wherein the message communication module is further configured to communicate a repeat data including a repeat portion based on the repeat metric for re-communicating the preceding data or a portion therein for communicating with a device.

An embodiment of the present invention provides a method of operation of a communication system including: communicating a preceding data before a repeat request; determining a repeat metric associated with the repeat request for re-communicating the preceding data or a portion therein; and communicating a repeat data including a repeat portion based on the repeat metric for re-communicating the preceding data or a portion therein for communicating with a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
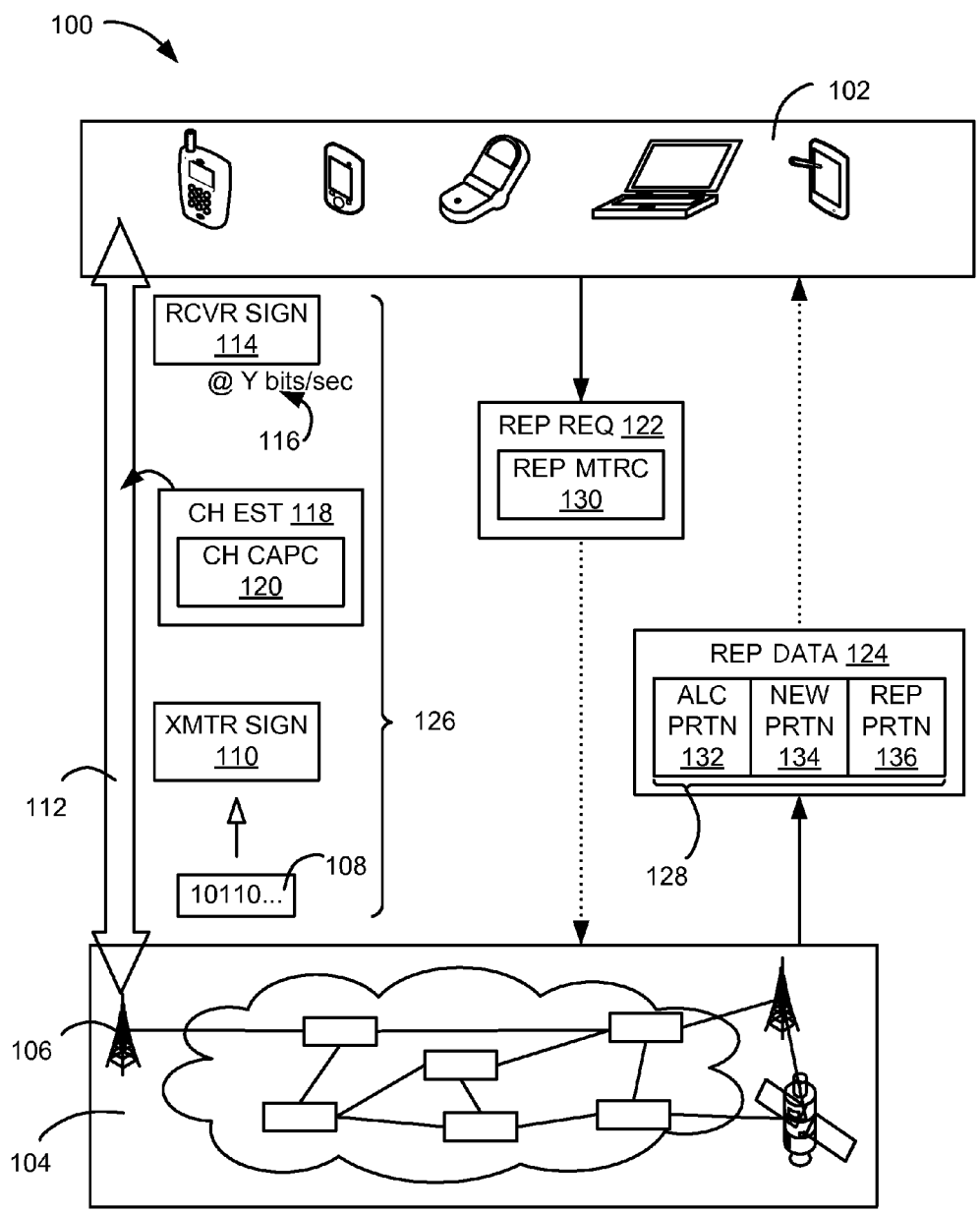
FIG. 1 is a communication system with flexible repeat-response mechanism in an embodiment of the present invention.

The following embodiments of the present invention can be used to communicate a repeat data for re-communicating a preceding data associated with communication content. The repeat data can include a repeat metric or a next-repeat bandwidth for controlling a repeat portion, a new portion, or a combination thereof in the repeat data.

An embodiment of the present invention can include the repeat metric or the next-repeat bandwidth based on a channel estimate or a channel capacity, a transmission rate, a next-channel capacity, a metric adjustment, a feedback data, a current-repeat bandwidth, a transmission metric, or a combination thereof. The repeat metric can be used to determine an allocation portion for controlling amount of the repeat portion included in the repeat data as needed for determining the communication content from the preceding data and the repeat data.

An embodiment of the present invention can include the repeat metric, the next-repeat bandwidth, the allocation portion, or a combination thereof providing increased throughput. The repeat data including the allocation portion, the repeat portion, and the new portion therein provides increase in throughput without burdening the resources. A heuristic allocation mechanism using the metric adjustment and a greedy allocation mechanism using the current-repeat bandwidth and the transmission metric provide increased accuracy, throughput, and efficiency in resource management.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with flexible repeat-response mechanism in an embodiment of the present invention. The communication system 100 includes a first device 102, such as a cellular phone or a notebook computer, connected to a network 104. The first device 102 can be a mobile device for telecommunication systems. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a second device 106 for directly linking and communicating with the first device 102. The second device 106 can be a base station for telecommunication systems. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can include or be with a cell tower, a wireless router, an antenna, a processing device, or a combination thereof being used to send signals to or receive signals from the first device 102, such as a smart phone or a laptop computer.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106 can communicate a communication content 108 by sending a transmitter signal 110 to the first device 102. The communication content 108 is data from a transmitting device intended for communication by reproduction or processing at a receiving device. For example, the communication content 108 can be a sequence of bits intended for displaying, audibly recreating, executing instructions, storing, or a combination thereof at a receiving device, such as the mobile station 102.

The second device 106 can modify the communication content 108 to generate and transmit the transmitter signal 110. The transmitter signal 110 is data actually transmitted by a device for communication and having a format for transmission. The second device 106 can generate the transmitter signal 110 by modifying, such as by interleaving or by adding formatting information, the communication content 108 according to methods or standardizations predetermined by the communication system 100. The second device 106 can further generate and transmit the transmitter signal 110 as a sequence of symbols corresponding to the communication content 108 according to a modulation and coding scheme, such as quadrature amplitude modulation (QAM) or phase-shift keying (PSK).

The transmitter signal 108 can arrive at the mobile station 102 after traversing a transmitter channel 112. The transmitter channel 112 can be wireless, wired, or a combination thereof. The transmitter channel 112 can be a direct link between the first device 102 and the second device 106 or can include repeaters, amplifiers, or a combination thereof. For example, the transmitter channel 112 can include communication frequency, time slot, packet designation, transmission rate, channel code, or a combination thereof used for transmitting signals between the first device 102 and the second device 106.

The mobile station 102 can receive a receiver signal 114. The receiver signal 114 is information received by a device in the communication system 100. The receiver signal 114 can include the transmitter signal 108 that has been altered from traversing the transmitter channel 112, interference signals from other sources, noise, or a combination thereof.

The receiver signal 114 can be received information corresponding to a transmission block communicated during a transmission interval. The transmission block is a unit or grouping of information transmitted within a specific unit of time, code, space, frequency, or a combination thereof. The transmission interval is a period of time designated for transmission for each device. The details and interaction for the transmission block and the transmission interval can be predetermined by the communication system 100, the communication standard, or a combination thereof.

The communication of the communication content 108 can have a transmission rate 116 associated therewith. The transmission rate 116 is a speed of exchanging information between devices. The transmission rate 116 can be represented by amount of information transmitted, received, repeated, or a combination thereof for a given unit of time.

The communication system 100 can estimate a channel estimate 118 from the receiver signal 114. The channel estimate 118 is a description of changes to signals caused by the transmitter channel 112. The channel estimate 118 can describe and quantize reflection, loss, delay, refraction, obstructions, or a combination thereof a signal can experience while traversing between the second device 106 and the first device 102. The channel estimate 118 can be a matrix value characterizing the transmitter channel 112.

The channel estimate 118 can include a channel capacity 120. The channel capacity 120 is the amount of information that can be accommodated by the transmitter channel 112. The channel capacity 120 can be the amount of information that can be reliably communicated based on physical or system conditions. The channel capacity 120 can be associated with the channel quality indication or feedback. The channel capacity 120 can be estimated by the communication system 100. Details regarding the channel capacity 120 will be discussed below.

The receiving device can transmit a repeat request 122 based on processing the receiver signal 114. The repeat request 122 can be an acknowledgement (ACK) of successful processing or a negative-acknowledgement (NACK) corresponding to unsuccessful processing or error checking result by the first device 102. The repeat request 122 can be sent from the receiving device to the transmitting device, such as from the mobile station 102 to a second device 106.

The transmitting device can retransmit the communication content 108, or a portion therein based on the repeat request 122. The transmitting device can transmit a repeat data 124 in response to the repeat request 122. The repeat data 124 is a different instance of the transmitter signal 108 including a retransmission of the communication content 108 or a portion therein based on the repeat request 132. The repeat data 124 can have identical or different header portion, format portion, error processing scheme, modulation and coding scheme (MCS) in comparison to the receiver signal 114. The repeat data 124 can be sent from the transmitting device to the receiving device, such as from the second device 106 to the first device 102.

For example, the first device 102 can receive a preceding data 126 as an instance of the receiver signal 114. The first device 102 can transmit the repeat request 122 based on a non-successful status in decoding the preceding data 126 to the second device 106.

Continuing with the example, the first device 102 can signify the non-successful status in decoding based on absence of the ACK, actively transmitting the NACK, or a combination thereof through the repeat request 122. The second device 106 can transmit the repeat data 124 based on receiving the repeat request 122 for repeating all or a portion of the communication content 108 as originally intended for communication with the preceding data 126.

Also for example, the repeat request 122 and the repeat data 124 can follow a hybrid automatic-repeat-request (HARM) scheme. The repeat data 124 can be according to chase combining scheme, incremental redundancy scheme, or a combination thereof using the same or different instance of the MCS between transmitting for the preceding data 126 and the repeat data 124.

The communication between devices, such as the repeat request 122, the repeat data 124, the preceding data 126, or a combination thereof can include a total bandwidth 128. The total bandwidth 128 is an amount of resource for communicating information between devices. The total bandwidth 128 can also include a grouping of frequencies available for communication. The total bandwidth 128 can further include the grouping of frequencies used for communicating information, such as for the receiver signal 114, the repeat request 122, the repeat data 124, or a combination thereof.

The communication system 100 can further have the repeat request 122 including a repeat metric 130. The repeat metric 130 is an indication for specifying repeated information. The repeat metric 130 can specify amount of data, location, type, or identification of data, or a combination thereof.

For example, the repeat metric 130 can indicate 20% of the preceding data 126 would be necessary to determine the communication content 108. Also for example, the repeat metric 130 can indicate that the error or the requested repeat information is in the last ⅓ of the preceding data 126 or the communication content 108, starting position of a rotating buffer for determining the repeat information, or a combination thereof.

The communication system 100 can further have the repeat data 124 including an allocation portion 132, a new portion 134, a repeat portion 136, or a combination thereof. The repeat request 122 including the allocation portion 132, the new portion 134, the repeat portion 136, or a combination thereof can be based on the repeat metric 130 of the repeat request 122.

The allocation portion 132 is information within the repeat data 124 that represents amount of resources dedicated to the new portion 134, the repeat portion 136, or a combination thereof. The allocation portion 132 can be part of a header portion or a control portion. The allocation portion 132 can be based on a designated location, order, format, or a combination thereof.

For example, the allocation portion 132 can be the first or last group of symbols, or the 8th bit to the $16^{th}$ bit in the receiver signal 114. Also for example, the allocation portion 132 can indicate amount of bits or symbols used for communicating the new portion 134, the repeat portion 136, or a combination thereof. For further example, the allocation portion 132 can indicate a ratio for amounts of information corresponding to the new portion 134 or the repeat portion 136.

The new portion 134 is information that was previously not included in the preceding data 126. The new portion 134 can be associated with the communication content 108 not included in the preceding data 126 or a different instance of the communication content 108.

The repeat portion 136 is information that was previously included in the preceding data 126. The repeat portion 136 can be associated with the communication content 108 or a portion therein included in the preceding data 126. The repeat portion 136 can be the information included in the repeat data 124 in response to the repeat request 122.

The repeat data 124 can include the repeat portion 136 only without the new portion 134. The repeat data 124 can also include more of the new portion 134 than the repeat portion 136. The amount of information included in the repeat portion 136 can be based on the repeat metric 130. The allocation portion 132 can indicate the amount of information included in the repeat portion 136.

For example, the communication system 100 can receive the preceding data 126 at the first device 102. The first device 102 can process the preceding data 126. Based on the processing results, the first device 102 can request for a repeat transmission using the repeat request 122. The first device 102 can also send the repeat metric 130 to specify amount, location, type, identity, or a combination thereof for information that should be repeated.

Continuing with the example, the second device 106 can receive the repeat request 122 having the repeat metric 130. The second device 106 can generate the repeat data 124 having the repeat portion 136 for information as indicated by the repeat metric 130. The second device 106 also include the new portion 134 within the given instance of the transmission interval for the repeat data 124. The second device 106 can indicate the amount or location for the new portion 134 and the repeat portion 136 in the allocation portion 132 to generate the repeat data 124. Details regarding the repeat metric 130, the repeat data 124, portions therein, or a combination thereof will be discussed below.

It has been discovered that the repeat metric 130 provides increased throughput. The repeat metric 130 allows the repeat transmissions to flexibly allocate bandwidth for repeated information, which can increase the efficiency in the use of resources.

It has also been discovered that the repeat data 124 having the allocation portion 132, the repeat portion 136, and the new portion 134 therein provides increase in throughput without burdening the resources. The repeat data 124 having the allocation portion 132, the repeat portion 136, and the new portion 134 therein can communicate only as much repeat information as necessary and use the rest of the resources to communicate the new information.

For illustrative purposes, the communication system 100 is described as the second device 106 transmitting information and the first device 102 receiving the transmitted information. However, it is understood that the communication system 100 can have the second device 106 as the receiving device and the first device 102 as the transmitting device.

Also for illustrative purposes, the total bandwidth 128 is described as the amount of resources used for the combination of the allocation portion 132, the repeat portion 136, and the new portion 134. However, it is understood that the total bandwidth 128 can correspond to a portion of the repeat data 124, such as for the repeat portion 136, the new portion 134, or a combination thereof.

Figure 2:
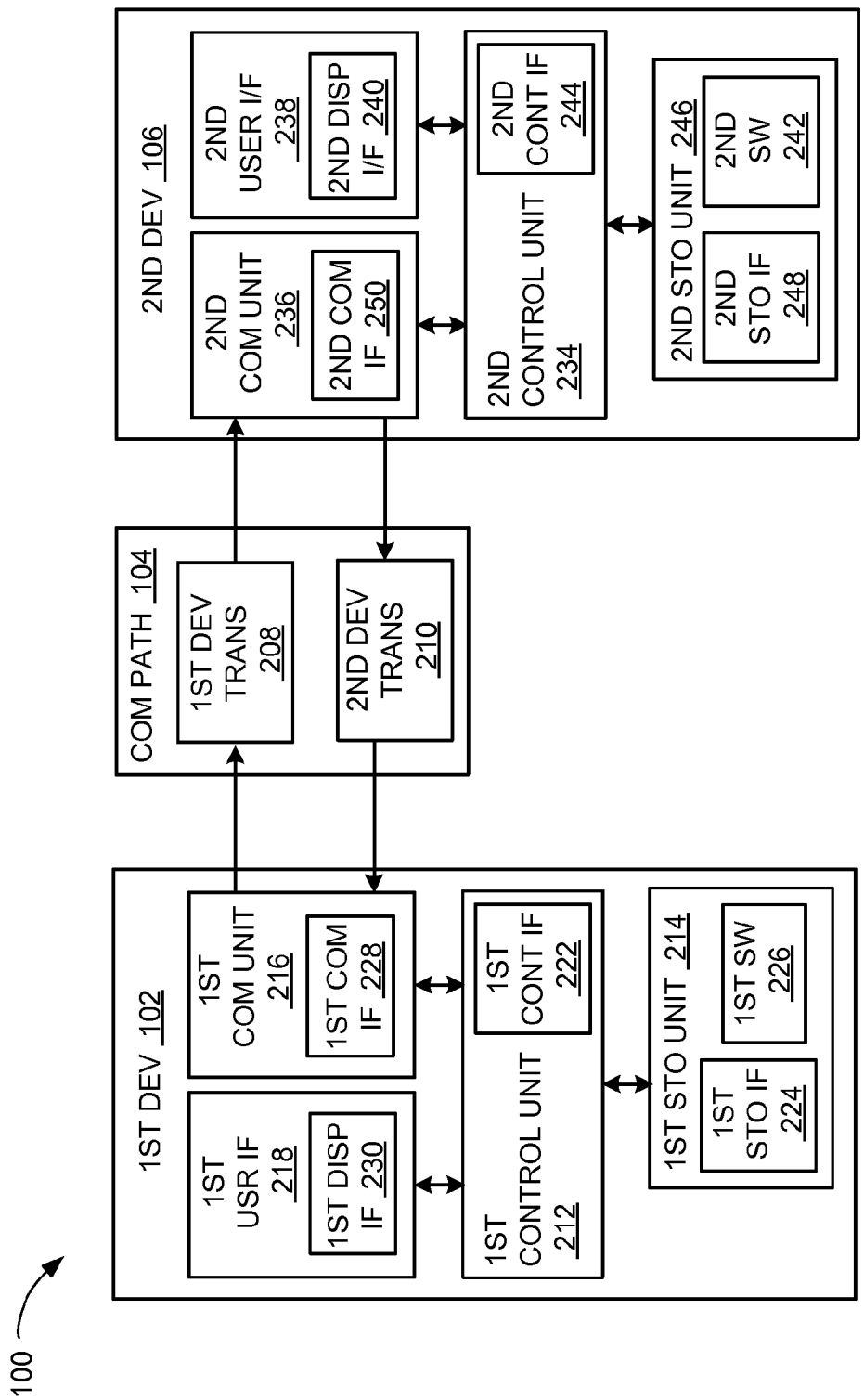
FIG. 2 is an exemplary block diagram of the communication system.

Referring now to FIG. 2, therein is shown an exemplary block diagram of the communication system 100. The communication system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the communication system 100. The first control unit 212 can also execute the first software 226 for the other functions of the communication system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The communication system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 3:
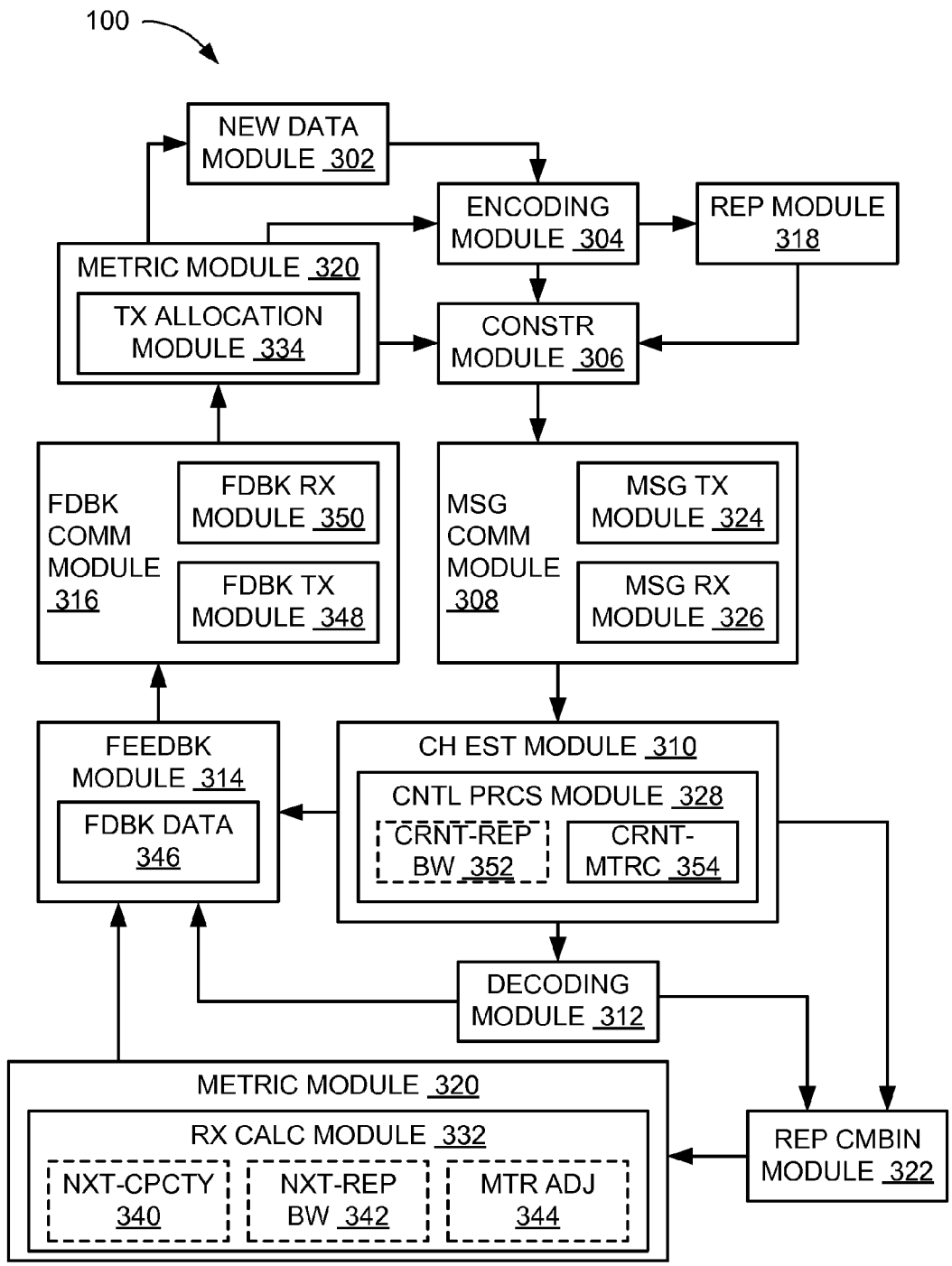
FIG. 3 is a control flow of the communication system.

Referring now to FIG. 3, therein is shown a control flow of the communication system 100. The communication system 100 can include a new data module 302, an encoding module 304, a construction module 306, a message communication module 308, a channel estimation module 310, a decoding module 312, a feedback module 314, and a feedback communication module 316. The communication system 100 can further include a repeat module 318, a metric module 320, and a repeat combining module 322.

The new data module 302 can be coupled to the encoding module 304, the metric module 320, or a combination thereof. The encoding module 304 can be coupled to the repeat module 318, the construction module 306, the metric module 320, or a combination thereof. The repeat module 318 can be further coupled to the construction module 306, which can be coupled to the metric module 320, the message communication module 308, or a combination thereof.

The message communication module 308 can be coupled to the channel estimation module 310, which can be coupled to the decoding module 312, the repeat combining module 322, the feedback module 314, or a combination thereof. The repeat combining module 322 can be further coupled to the decoding module 312, the metric module 320, or a combination thereof. The metric module 320 can be coupled to the feedback module 314.

The feedback module 314 can be coupled to the decoding module 312, the feedback communication module 316, or a combination thereof. The feedback communication module 316 can be further coupled to the metric module 320.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof.

As a more specific example, one or more outputs of the metric module 320 can be connected to one or more inputs of the encoding module 304, the construction module 306, the feedback module 314, or a combination thereof using conductors or wireless communication devices. Also for example, the metric module 320 can receive data, control signal, or a combination thereof from the repeat combining module 322, the feedback communication module 316, or a combination thereof based on one or more process steps and sequences.

The communication system 100 can communicate with a device, such as by displaying images, recreating sounds, exchanging process steps or instructions, or a combination thereof. The communication system 100 can initiate the communication by sending information from a transmitting device to a receiving device. The receiving device can request the information to be repeated through a retransmission. The communication system 100 can use the new data module 302 for the initial transmission of the information.

The new data module 302 is configured to determine the communication content 108 of FIG. 1. The new data module 302 can determine the communication content 108 by receiving user input, such as with the first user interface 218 of FIG. 2, the second user interface 238 of FIG. 2, the first control unit 212 of FIG. 2, the second control unit 248 of FIG. 2, or a combination thereof. The new data module 302 can set the user input as the communication content 108.

For example, the new data module 302 can set the user's voice signal as the communication content 108 for a phone call, a command, a voice message, a note, or a combination thereof. Also for example, the new data module 302 can receive the user selection, textual inputs, commands, content, or a combination thereof through an input device and set the input, corresponding content, or a combination thereof as the communication content 108.

The new data module 302 can also determine the communication content 108 by initiating processes or by receiving information from other devices. For example, an operating system or a schedule calendar on the second device 106 of FIG. 1 or the first device 102 of FIG. 1 can initiate processes that designate data for communication, which can be determined as the communication content 108 by the new data module 302.

Also for example, other devices in communication with or through the second device 106, the first device 102, or a combination thereof can designate data for communication for the communication system 100. As a more specific example, a phone tethered to the first device 102 or a different device communicating through the second device 106 to the first device 102 can designate content information for communication, which can be determined as the communication content 108 by the new data module 302.

The new data module 302 can further determine the communication content 108 by formatting the communication content 108. The new data module 302 can format by controlling a size of the communication content 108 for the communication. The new data module 302 can control the size of the communication content 108 based on any known channel information, modulation or coding scheme, a size of the transmission block, the transmission interval, or a combination thereof.

After determining the communication content 108, the control flow can be passed to the encoding module 304. The control flow can pass through a variety of ways. For example, control flow can pass by having processing results of one module passed to another module, such as by passing the communication content 108 from the new data module 302 to the encoding module 304, by storing the processing results at a location known and accessible to the other module, such as by storing the communication content 108 at a storage location known and accessible to the encoding module 304, by notifying the other module, such as by such as by using a flag, an interrupt, a status signal, or a combination for the encoding module 304, or a combination of processes thereof.

The encoding module 304 is configured to encode information. The encoding module 304 can encode the information by rearranging the communication content 108, determining and adding parity information, or a combination thereof. The encoding module 304 can encode the information according to an encoding scheme predetermined by the communication system 100, a communication standard, or a combination thereof.

The encoding module 304 can encode the information to generate one or more code words corresponding to the communication content 108. The encoding module 304 can use the first communication unit 216 of FIG. 2, the second communication unit 236 of FIG. 2, the first control unit 212, the second control unit 234, or a combination thereof to encode the information.

After encoding the communication content 108, the control flow can be passed to the repeat module 318, the construction module 306, or a combination thereof. The control flow can pass similarly as described above between the new data module 302 and the encoding module 304, but using the processing results of the encoding module, such as encoded instance of the communication content 108 or a portion therein.

The repeat module 318 is configured to determine information for repeating communications. For initial transmissions or communications not associated with any instance of the repeat request 122 of FIG. 1, the repeat module 318 can store the communication content 108. The initially transmitted message for the communication content 108 can be the preceding data 126 of FIG. 1 based on processing by the receiving device, such as a failure in error check, based on transmission of the repeat data 124 of FIG. 1, or a combination thereof. The repeat module 318 can store the content of the preceding data 126 for repeat communications.

The repeat module 318 can use the first control interface 222 of FIG. 2, the second control interface 244 of FIG. 2, first communication interface 228 of FIG. 2, the second communication interface 250 of FIG. 2, the first storage unit 214 of FIG. 2, the second storage unit 246 of FIG. 2, or a combination thereof to store the communication content 108, a portion therein, such as the information portion or the parity portion, a derivation thereof, or a combination thereof. Descriptions of the repeat module 318 for repeat transmissions will be discussed below.

The construction module 306 is configured to generate the transmitter signal 110 of FIG. 1. The construction module 306 can generate the transmitter signal 110 for initial communications without associations to the repeat request 122, for repeat communications associated with the repeat request 122, or a combination thereof.

For initial communications, the construction module 306 can generate the transmitter signal 110 as a sequence of symbols corresponding to the encoded instance of the communication content 108. The construction module 306 can further combine a header portion, a reference portion, a format portion, or a combination thereof with the encoded instance of the communication content 108 to generate the transmitter signal 110.

The construction module 306 can use the first control unit 212, the second control unit 234, the first communication unit 216, the second communication unit 236, or a combination thereof to generate the transmitter signal 110. Descriptions of the construction module 306 for repeat transmissions will be discussed below.

After generating the transmitter signal 110, the control flow can be passed to the message communication module 308. The control flow can pass similarly as described above between the new data module 302 and the encoding module 304, but using the processing results of the construction module 306, such as the transmitter signal 110.

The message communication module 308 is configured to exchange content information between devices. The message communication module 308 can exchange information by transmitting, receiving, or a combination thereof for the content information. The message communication module 308 can include a message transmission module 324, a message receiver module 326, or a combination thereof.

The message transmission module 324 is configured to send information from the transmitting device. For example, the message transmission module 324 can transmit the transmitter signal 110 from the first device 102, from the second device 106, or a combination thereof. Also for example, the message transmission module 324 can transmit the preceding data 126 during the initial communication, before any corresponding instance of the repeat request 122, or a combination thereof.

The message transmission module 324 can use the first communication unit 216, the second communication unit 236, or a combination thereof to transmit the information. For example, the message transmission module 324 can use the first communication unit 216, the second communication unit 236, or a combination thereof to transmit the transmitter signal 110 using wired or wireless communication protocol, equipment, or a combination thereof. Also for example, the message transmission module 324 can use the first communication unit 216, the second communication unit 236, or a combination thereof to transmit transmitter signal 110 by fluctuating voltage or current levels, affecting changes in electro-magnetic field, or a combination thereof.

The message receiver module 326 is configured to receive information from the transmitting device for the receiving device. For example, the message receiver module 326 can receive the receiver signal 114 of FIG. 1 corresponding to the transmitter signal 110 for the first device 102, from the second device 106, or a combination thereof. Also for example, the message receiver module 326 can receive the preceding data 126 during the initial communication, before any corresponding instance of the repeat request 122, or a combination thereof.

The message receiver module 326 can use the first communication unit 216, the second communication unit 236, or a combination thereof to receive the information. For example, the message receiver module 326 can use the first communication unit 216, the second communication unit 236, or a combination thereof to receive the receiver signal 114 for wired or wireless communication. Also for example, the message receiver module 326 can use the first communication unit 216, the second communication unit 236, or a combination thereof to receive the receiver signal 114 by detecting fluctuations and changes in electro-magnetic field, detecting changes in power at a frequency, or a combination thereof.

The message transmission module 324 and the message receiver module 326 can be coupled with wires or through wireless communication. The message transmission module 324 and the message receiver module 326 can be a part of the network 104.

The message communication module 308 can communicate the communication content 108, or a derivate thereof, such as the transmitter signal 110 and the receiver signal 114. The initial communication of the communication content 108, without any associations to the repeat request 122, can be the preceding data 126. The message communication module 308 can communicate the preceding data 126, such as by transmitting the preceding data 126, receiving the preceding data 126, or a combination thereof.

After receiving the receiver signal 114, the control flow can pass to the channel estimation module 310. The control flow can pass similarly as described above between the new data module 302 and the encoding module 304, but using the processing results of the message communication module 308, such as the receiver signal 114.

The channel estimation module 310 is configured to characterize the transmitter channel 112 of FIG. 1 for recovering the transmitter signal 110 from the receiver signal 114. The channel estimation module 310 can characterize by calculating the channel estimate 118 of FIG. 1, including the channel capacity 120 of FIG. 1. The channel estimation module 310 can calculate the channel estimate 118 based on a known portion in the receiver signal 114.

For example, the channel estimation module 310 can use a reference portion or a pilot tone having a frequency, a phase, an amplitude profile, a shape, a power level, or a combination thereof predetermined by the communication system 100, the communication standard, or a combination thereof. The transmitter signal 110 can be transmitted with the reference portion or the pilot tone according to the predetermination.

Continuing with the example, the receiver signal 114 can have the reference portion or the pilot tone in a corresponding location of the receiver signal 114, but including effects from traversing the transmitter channel 112. The channel estimation module 310 can determine the channel estimate 118 based on a difference between the predetermined instance of the reference portion or the pilot tone and the portion in the receiver signal 114 corresponding to the reference portion or the pilot tone.

As a more specific example, the channel estimation module 310 can include a model or a vector for changes in amplitude, power, shape, frequency, phase, or a combination thereof. Also as an example, the channel estimation module 310 can include delays, delay levels corresponding to phases, or a combination thereof.

The channel estimation module 310 can further determine the total bandwidth 128 of FIG. 1, the transmission rate 116 of FIG. 1, and noise portion associated with the receiver signal 114. The channel estimation module 310 can determine the total bandwidth 128 based on the frequencies, time duration, number of channels, or a combination thereof consumed by the receiver signal 114.

Similarly, the channel estimation module 310 can determine the transmission rate 116 based on the amount of information, the coding and modulation scheme, the time duration, the number of channels, or a combination thereof associated with the receiver signal 114. The channel estimation module 310 can determine the noise portion within the receiver signal 114 directly from the receiver signal 114, such as using the reference portion or the pilot tone, or using an independent noise determination circuit.

The channel estimation module 310 can further calculate the channel capacity 120. For example, the channel estimation module 310 can calculate the channel capacity 120 based on the channel estimate 118, the noise portion, the total bandwidth 128, the transmission rate 116, or a combination thereof.

Also for example, the channel estimation module 310 can further determine the channel capacity 120 based on selecting channel models fitting the channel estimate 118. As a more specific example, the channel estimation module 310 can find the channel capacity 120 linked to a set of ranges having the channel estimate 118 included therein based on information predetermined by the communication system 100.

The channel estimation module 310 can include a control processing module 328. The control processing module 328 can be dormant or not used for processing initial communications unassociated with any instance of the repeat request 122.

The control processing module 328 can search for the allocation portion 132 of FIG. 1, the repeat portion 136, reference to the repeat request 122 or the preceding data 126, any indication identifying the receiver signal 114 as the repeat data 124, or a combination thereof. The control processing module 328 can remain dormant or inactive when the receiver signal 114 is the initial communication and not the repeat data 124, and does not include the allocation portion 132, the repeat portion 136, reference to the repeat request 122 or the preceding data 126, any indication identifying the receiver signal 114 as the repeat data 124, or a combination thereof. Details regarding the control processing module 328 will be discussed below.

The channel estimation module 310 can use the first control unit 212, the second control unit 234, the first communication unit 216, the second communication unit 236, or a combination thereof to calculate the channel estimate 118, the channel capacity 120, or a combination thereof. The channel estimation module 310 can store the channel estimate 118, the channel capacity 120, or a combination thereof in the first storage unit 214, the second storage unit 246, or a combination thereof.

After characterizing the transmitter channel 112, the control flow can pass to the feedback module 314, the decoding module 312, the repeat combining module 322, or a combination thereof. The control flow can pass similarly as described above between the new data module 302 and the encoding module 304, but using the processing results of the channel estimation module 310, such as the channel estimate 118, the channel capacity 120, or a combination thereof.

The decoding module 312 is configured to determine content of the receiver signal 114. The decoding module 312 can process the receiver signal 114, such as through detection, decoding, interleaving, de-interleaving, or a combination thereof, for determining the communication content 108.

For example, the decoding module 312 can calculate likelihood based values for representing correlation of a portion of the receiver signal 114 with an instance of a symbol in the constellation or a value of a bit. The decoding module 312 can determine a content candidate of the receiver signal 114 as a sequence of symbols or bits having highest likelihood based results, results that are above a threshold value, or a combination thereof. Also for example, the decoding module 312 can use maximum-likelihood mechanism, maximum a-posteriori mechanism, or a combination thereof.

The decoding module 312 can further evaluate the content candidate. For example, the decoding module 312 can perform an error check, such as cyclic redundancy check (CRC), check sum error check, low-density parity-check (LDPC), or a combination thereof on the content candidate.

The decoding module 312 can determine the content candidate as the communication content 108 when the error check results in no errors. The decoding module 312 can start the process for transmitting the repeat request 122 when the content candidate fails the error check. The decoding module 312 can further classify the receiver signal 114, the content candidate, derivation thereof, portion therein, processing results thereof, or a combination thereof as the preceding data 126 when the content candidate fails the error check.

For example, the decoding module 312 can pass a signal or a notice to the repeat combining module 322, the feedback module 314, or a combination thereof representing the error check result. Also for example, the decoding module 312 can pass the content candidate, the receiver signal 114, a portion therein, or a combination thereof to the repeat combining module 322.

The decoding module 312 can use the first control unit 212, the second control unit 234, the first communication unit 216, the second communication unit 236, or a combination thereof to determine the content from the receiver signal 114. The decoding module 312 can store the content candidate, the receiver signal 114, a portion therein, or a combination thereof in the first storage unit 214, the second storage unit 246, or a combination thereof.

After evaluating the content candidate, the control flow can pass to the feedback module 314, the repeat combining module 322, or a combination thereof. The control flow can pass control flow can pass similarly as described above between the new data module 302 and the encoding module 304, but using the processing results of the decoding module 312, such as the communication content 108, the content candidate, the receiver signal 114, a portion therein, a derivation thereof, or a combination thereof.

The repeat combining module 322 can store the content candidate, the receiver signal 114, a portion therein, or a combination thereof from the decoding module 312 for the initial transmission resulting in processing error. The repeat combining module 322 can store the content candidate, the receiver signal 114, a portion therein, or a combination thereof in the first storage unit 214, the second storage unit 246, or a combination thereof.

After storing the decoding results, the control flow can pass to the metric module 320. The control flow can pass similarly as described above between the new data module 302 and the encoding module 304.

The metric module 320 is configured to determine a measure for controlling details regarding repeated information in repeat transmissions. The metric module 320 can determine the measure for repeated information by determining the repeat metric 130 of FIG. 1, the allocation portion 132, a derivation thereof, or a combination thereof. The metric module 320 can determine the measure from the perspective of the receiving device, the transmitting device, or a combination thereof. For example, the metric module 320 can determine the controlling measure using the first device 102, the second device 106, or a combination thereof.

The metric module 320 can include a receiver calculation module 332, a transmission allocation module 334, or a combination thereof. The transmission allocation module 334 is configured to determine the controlling measure for repeated information in repeat transmissions from the perspective of the transmitting device. Details regarding the transmission allocation module 334 are discussed below.

The receiver calculation module 332 is configured to determine the controlling measure for repeated information in repeat transmissions from the perspective of the receiving device. For example, the receiver calculation module 332 can determine the control measure using the first device 102. Also for example, the receiver calculation module 332 can determine the repeat metric 130 based on the preceding data 126.

The receiver calculation module 332 can determine the controlling measure by estimating a next-capacity 340, by calculating a next-repeat bandwidth 342, or a combination thereof. The next-capacity 340 is an estimate for an amount of information that can be accommodated by the transmitter channel 112 at a later time. The next-capacity 340 can be the estimate of the channel capacity 120 at a later time when the repeat data 124 is transmitted, received, or a combination thereof.

The receiver calculation module 332 can estimate the next-capacity 340 based on the channel capacity 120, the channel estimate 118, or a combination thereof. The receiver calculation module 332 can further estimate the next-capacity 340 based on previous values, patterns, or a combination thereof for the channel capacity 120, the channel estimate 118, or a combination thereof.

The next-repeat bandwidth 342 is amount of resources that would be required in a repeat communication to successfully determine the original content. The next-repeat bandwidth 342 can be a range of frequencies, number of bits, or a combination thereof required for receiving repeated information for successfully determining the communication content 108.

The next-repeat bandwidth 342 can be used as the repeat metric 130 for controlling the repeated data in a repeat communication for the communication content 108. The receiver calculation module 332 can determine the repeat metric 130 for balancing the repeat portion 136 in the repeat data 124 corresponding to the preceding data 126, the repeat portion 136 for re-processing the preceding data 126, the repeat data 124, or a combination thereof for the communication content 108.

The receiver calculation module 332 can calculate the next-repeat bandwidth 342 based on the next-capacity 340, the channel capacity 120, the transmission rate 116, amount of repeated data within the receiver signal 114, or a combination thereof. The receiver calculation module 332 can calculate the next-repeat bandwidth 342 based on:

$$b_2 = \frac{(r_1 - c_1)(1 - b_1)}{c_2}. \qquad \text{Equation (1).}$$

For Equation (1), the next-repeat bandwidth 342 can be represented as '$b_2$'. The term '$c_1$' can represent the channel capacity 120 and '$c_2$' can represent the next-capacity 340. The term '$r_1$' can represent the transmission rate 116. The term '$b_1$' can be given a value of 0 for the initial transmission or the preceding data 126 without any associated instance of the repeat request 122 preceding thereof. Details regarding the term '$b_1$' is described below.

The receiver calculation module 332 can further calculate the next-repeat bandwidth 342 based on a metric adjustment 344. The metric adjustment 344 is a value or a set of values compensating for possible errors in estimating the next-capacity 340. The metric adjustment 344 can be a value greater than 1.

The receiver calculation module 332 can calculate the next-repeat bandwidth 342 based on the metric adjustment 344 for a heuristic allocation mechanism, represented as:

$$b_2 = \beta \frac{(r_1 - c_1)(1 - b_1)}{\hat{c}_2}. \qquad \text{Equation (2).}$$

The term '$\beta$' can represent the metric adjustment 344 and the term '$\hat{c}_2$' can represent the estimated instance of the next-capacity 340. The receiver calculation module 332 can further use Equation (1) with the metric adjustment 344. The metric adjustment 344 can be predetermined by the communication system 100. The metric adjustment 344 can further be selected by the receiver calculation module 332 based on the channel estimate 118, the channel capacity 120, the next-capacity 340, or a combination thereof.

It has been discovered that the heuristic allocation mechanism using the metric adjustment 344 provide increased accuracy in determining the communication content 108. The heuristic allocation mechanism using the metric adjustment 344 can adjust for the inaccuracies introduced by estimating the next-capacity 340 and determine the next-repeat bandwidth 342 using a low-complexity calculation method. The adjustment and the use of low-complexity method can increase the rate and frequency of determination, which can further improve accuracy and relevance to real-time channel state.

The receiver calculation module 332 can further calculate the next-repeat bandwidth 342 a greedy allocation mechanism, represented as:

$$\max_{0 \leq b_2 \leq 1} \left\{ r_1(1 - b_1)\left(1 - F\left(\frac{m_1}{b_2}\right)\right) + \hat{c}_2(1 - b_2) \right\}. \qquad \text{Equation (3).}$$

For Equation (3), the term '$m_1$' can represent $(r_1 - c_1)(1 - b_1)$ and is discussed in further detail below. The function '$F(x)$' can be based on the estimation for the next-capacity 340 and can be represented as:

$$F(x) = P(c_2 < x | \hat{c}_2). \qquad \text{Equation (4).}$$

Further, the receiver calculation module 332 can use:

$$E(c_2 | \hat{c}_2) = \hat{c}_2. \qquad \text{Equation (5).}$$

The receiver calculation module 332 can use the first control unit 212, the second control unit 234, the first communication unit 216, the second communication unit 236, or a combination thereof to estimate the next-capacity 340, calculate the next-repeat bandwidth 342, or a combination thereof. The receiver calculation module 332 can store the next-capacity 340, the next-repeat bandwidth 342, or a combination thereof in the first storage unit 214, the second storage unit 246, or a combination thereof.

After calculate the controlling measure, the control flow can pass to the feedback module 314. The control flow can pass control flow can pass similarly as described above between the new data module 302 and the encoding module 304, but using the processing results of the receiver calculation module 332, such as the next-capacity 340, the next-repeat bandwidth 342, a portion therein, a derivation thereof, or a combination thereof.

The feedback module 314 is configured to generate information for feeding back from the receiving device to the transmitting device. The feedback module 314 can generate a feedback data 346 for generating the information for feeding back between devices.

The feedback data 346 is information sent from the receiving device to the transmitting device. The feedback data 346 can be for representing the channel estimate 118 associated with the preceding data 126. The feedback data 346 can also be for requesting the repeat data 124 for decoding the preceding data 126.

The feedback data 346 can include the channel estimate 118 or a derivation thereof as channel state information at the receiving device or channel quality information (CQI) for the transmitting device. The feedback data 346 can further include the repeat request 122 based on decoding status from the decoding module 312. The feedback data 346 can include the NACK or withhold the ACK when the decoding module 312 fails to determine the communication content 108 from the receiver signal 114.

The feedback data 346 can also include the next-repeat bandwidth 342 as the repeat metric 130. The feedback module 314 can include the next-repeat bandwidth 342 when the decoding module 312 fails to determine the communication content 108 from the receiver signal 114.

The feedback module 314 can use the first control interface 222, the second control interface 244, the first communication interface 228, the second communication interface 250, the first control unit 212, the second control unit 234, the first communication unit 216, the second communication unit 236, or a combination thereof to generate the feedback data 346.

It has been discovered that the receiving device, such as the first device 102 determining the repeat metric 130 as the next-repeat bandwidth 342 and transmitting the feedback data 346 having the repeat metric 130 therein provides increased efficiency in resource management. The communication system 100 can use the next-repeat bandwidth 342 as determined by the receiving device to control the amount of repeated data necessary to determine the communication content 108 without using more bandwidth or data than necessary.

After generating the feedback data 346, the control flow can pass to the feedback communication module 316. The control flow can pass similarly as described above between the new data module 302 and the encoding module 304, but using the processing results of the construction module 306, such as the feedback data 346.

The feedback communication module 316 is configured to exchange feedback information between devices. The feedback communication module 316 can exchange information by transmitting, receiving, or a combination thereof for the feedback information. The feedback communication module 316 can include a feedback transmission module 348, a feedback receiver module 350, or a combination thereof.

The feedback transmission module 348 is configured to transmit the feedback data 346. The feedback transmission module 348 can transmit the feedback data 346 based on the repeat metric 130, the channel estimate 118, the channel capacity 120, the repeat request 122, a derivation thereof, or a combination thereof. The feedback transmission module 348 can transmit the feedback data 346 based on the processing results of the feedback module 314.

The feedback transmission module 348 can transmit the feedback data 346 similar to the message transmission module 324 transmitting the transmitter signal 110. For example, the feedback transmission module 348 can use the first communication unit 216, the second communication unit 236, or a combination thereof to transmit the feedback data 346.

The feedback receiver module 350 is configured to receive the feedback data 346. The feedback receiver module 350 can receive the feedback data 346 corresponding to the receiver signal 114 representing the preceding data 126, after transmitting the preceding data 126. The feedback receiver module 350 can receive the feedback data 346 including the repeat request 122, the repeat metric 130, the channel estimate 118, the next-repeat bandwidth 342, a derivation thereof, or a combination thereof.

The feedback receiver module 350 can receive the feedback data 346 similar to the message receiver module 326 receiving the receiver signal 114. For example, the feedback receiver module 350 can use the first communication unit 216, the second communication unit 236, or a combination thereof to receive the feedback data 346.

The feedback transmission module 348 and the feedback receiver module 350 can be coupled with wires or through wireless communication. The feedback transmission module 348 and the feedback receiver module 350 can be a part of the network 104.

After receiving the feedback data 346, the control flow can pass to the metric module 320. The control flow can pass similarly as described above between the new data module 302 and the encoding module 304, but using the processing results of the feedback communication module 316, such as the feedback data 346.

The metric module 320 can determine the repeat metric 130, the allocation portion 132, a derivation thereof, or a combination thereof. The metric module 320 can determine the repeat metric 130, the allocation portion 132, a derivation thereof, or a combination thereof based on the feedback data 346.

The metric module 320 can include a transmission allocation module 334. The transmission allocation module 334 is configured to control the repeated data in response to the repeat request 122. The transmission allocation module 334 can control the repeated data by generating the allocation portion 132.

The transmission allocation module 334 can generate the allocation portion 132 by determining the repeat metric 130. The transmission allocation module 334 can determine the repeat metric 130 when the feedback data 346 does not include the repeat metric 130 or without using the repeat metric 130 or the next-repeat bandwidth 342 included in the feedback data 346. The transmission allocation module 334 can determine the repeat metric 130 based on the next-capacity 340, the channel estimate 118 or the CQI, the repeat request 122, or a combination thereof included in the feedback data 346.

The transmission allocation module 334 can determine the repeat metric 130 similarly as the receiver calculation module 332 calculating the next-repeat bandwidth 342. For example, the transmission allocation module 334 can estimate the next-capacity 340 or determine the next-capacity 340 from the feedback data 346. Also for example, the transmission allocation module 334 can calculate the next-repeat bandwidth 342 using one or more of Equations (1)-(5), and set the repeat metric 130 as the next-repeat bandwidth 342.

The transmission allocation module 334 generate the allocation portion 132 based on the repeat metric 130, as determined by the transmission allocation module 334 through calculations or as indicated in the feedback data 346. The transmission allocation module 334 can generate the allocation portion 132 as an indication for a size of the new portion 134 of FIG. 1, the repeat portion 136, or a combination thereof.

For example, the transmission allocation module 334 can generate the allocation portion 132 by including the next-repeat bandwidth 342 corresponding to the repeat portion 136 for the repeat data 124. Also for example, the transmission allocation module 334 can generate the allocation portion 132 by including a number of bits, an indication for the information portion or the parity portion, a location or position of the bits in the communication content 108, or a combination thereof.

The transmission allocation module 334 can use the first control unit 212, the second control unit 234, the first communication unit 216, the second communication unit 236, or a combination thereof to determine the repeat metric 130, generate the allocation portion 132, or a combination thereof. The receiver calculation module 332 can store the repeat metric 130, the allocation portion 132, or a combination thereof in the first storage unit 214, the second storage unit 246, or a combination thereof.

It has been discovered that the allocation portion 132 based on the repeat metric 130 provides increase in throughput without burdening the resources. The communication system 100 can use the allocation portion 132 to balance the repeat portion 136, the new portion 134, or a combination thereof to repeat only the amount necessary for each instance instead of repeating arbitrary amounts for all repeated transmissions. The allocation portion 132 can be used to transmit new information through the new portion 134 for the time, frequency, bandwidth, or a combination thereof remaining after the repeat portion 136.

It has also been discovered that the transmitting device, such as the second device 106 determining the repeat metric 130 as the next-repeat bandwidth 342 or the allocation portion 132 for transmitting the repeat data 124 provides increased efficiency in resource management. The communication system 100 can use the next-repeat bandwidth 342 or the allocation portion 132 as determined by the transmitting device to control the amount of repeated data necessary to determine the communication content 108 without using more bandwidth or data than necessary.

After generating the allocation portion 132, the control flow can pass to the new data module 302, the encoding module 304, the construction module 306, the repeat module 318, or a combination thereof. The control flow can pass similarly as described above between the new data module 302 and the encoding module 304, but using the processing results of the metric module 320, such as the allocation portion 132.

The communication system 100 can use the allocation portion 132 in a variety of ways. For example, the new data module 302 can be configured to determine the new portion 134 based on the allocation portion 132. The new data module 302 can determine the new portion 134 as new information having a size limited by amount of resources remaining in the transmission block, the transmission interval, the total bandwidth 128, or a combination thereof as based on the allocation portion 132, the repeat portion 136 as indicated by the allocation portion 132, or a combination thereof.

Continuing with the example, the encoding module 304 can encode the new portion 134 as described above. The encoded instance of the new portion 134 can be passed to the repeat module 318 for storage, the construction module 306 for generating the repeat data 124, or a combination thereof.

Also for example, the repeat module 318 can be configured to determine the repeat portion 136 corresponding to the preceding data 126 based on the repeat metric 130, the allocation portion 132, or a combination thereof. The repeat module 318 can determine the repeat portion 136 from the stored instance of the communication content 108 previously transmitted as the preceding data 126. The repeat module 318 can determine the repeat portion 136 as a portion of the stored instance of the communication content 108 or the preceding data 126 corresponding to the repeat metric 130, the allocation portion 132, or a combination thereof. The repeat module 318 can pass the repeat portion 136 to the construction module 306.

Also for example, the construction module 306 can generate the repeat data 124. The construction module 306 can generate the repeat data 124 having the allocation portion 132, the repeat portion 136, the new portion 134, or a combination thereof for transmitting the repeat data 124 in response to the repeat request 122. The construction module 306 can generate the repeat data 124 by combining the allocation portion 132, the repeat portion 136, the new portion 134, or a combination thereof as indicated by the repeat metric 130, the allocation portion 132, or a combination thereof.

Continuing with the example, the construction module 306 can further determine the new portion 134 instead of the new data module 302. As a more specific example, the construction module 306 can determine the new portion 134 based on the repeat portion 136, the repeat metric 130, the allocation portion 132, or a combination thereof. The construction module 306 can determine the new portion 134 as an amount of new information from the new data module 302, the encoding module 304, or a combination thereof according to the repeat metric 130 or the allocation portion 132.

Continuing with the example, the construction module 306 can also determine the new portion 134 as the amount of new information corresponding to the portion in the transmission block, the transmission interval remaining, the total bandwidth 128, or a combination thereof in excess of the repeat portion 136, the allocation portion 132, or a combination thereof.

Also as an example, the construction module 306 can determine the repeat portion 136 instead of the repeat module 318. The construction module 306 can determine the repeat portion 136 by receiving the stored instance of the preceding data 126 or the communication content 108 previously transmitted. The construction module 306 can determine the repeat portion 136 by identifying one or more portions of the stored instance according to the repeat metric 130 or the allocation portion 132.

The message communication module 308 can be further configured to communicate the repeat data 124 including the repeat portion 136 based on the repeat metric 130, the new portion 134, the allocation portion 132, or a combination thereof. The message communication module 308 can communicate the repeat data 124 for re-communicating the preceding data 126 or a portion therein in response to the repeat request 122 for communicating between devices in the communication system 100.

The message communication module 308 can communicate the repeat data 124 similar to the preceding data 126 as described above. For example, the message transmission module 324 can transmit the repeat data 124 using the first communication unit 216, the second communication unit 236, or a combination thereof. Also for example, the message receiver module 326 can receive the receiver signal 114 corresponding to the repeat data 124 using the first communication unit 216, the second communication unit 236, or a combination thereof.

The channel estimation module 310 can process the receiver signal 114 corresponding to the repeat data 124 as described above. The control processing module 328 can be configured to identify the receiver signal 114 corresponding to the repeat data 124 by identifying the allocation portion 132, the repeat portion 136, reference to the repeat request 122 or the preceding data 126, any indication identifying the receiver signal 114 as the repeat data 124, or a combination thereof in the receiver signal 114.

The control processing module 328 can identify the allocation portion 132 for the repeat data 124 according to formats or sequences predetermined by the communication system 100. The control processing module 328 can process the allocation portion 132, such as by detecting, decoding, determining, or a combination thereof. The control processing module 328 can use the allocation portion 132 to identify the new portion 134, the repeat portion 136, or a combination thereof in the receiver signal 114 corresponding to the repeat data 124.

The control processing module 328 can determine a current-repeat bandwidth 352, a transmission metric 354, or a combination thereof based on the receiver signal 114. The control processing module 328 can determine the current-repeat bandwidth 352, the transmission metric 354, or a combination thereof for a next instance of repeated communication.

The current-repeat bandwidth 352 is an amount of resource corresponding to the repeat portion 136. The current-repeat bandwidth 352 can be grouping of frequencies, number of bits or symbols, a duration of time, a proportion within the transmission block or the transmission interval, or a combination thereof dedicated or used to communicate the repeat portion 136.

The control processing module 328 can determine the current-repeat bandwidth 352 by determining a size of the repeat portion 136. The control processing module 328 can determine the current-repeat bandwidth 352 by calculating the grouping of frequencies, the number of bits or symbols, the duration of time, the proportion within the transmission block or the transmission interval, or a combination thereof based on the size of the repeat portion 136.

The transmission metric 354 is a measure associated with details of the receiver signal corresponding to the repeat data 124. The transmission metric 354 can be based on the transmission rate 116, the channel capacity 120, the current-repeat bandwidth 352, or a combination thereof. The transmission metric 354 can be represented as:

$$m_1 = (r_1 - c_1)(1 - b_1).$$  Equation (6).

The term '$b_1$' can represent the current-repeat bandwidth 352.

The communication system 100 can set the current-repeat bandwidth 352 to 0 for the initial instance of the communication since it includes no repeated information. The communication system 100 can determine and use the transmission metric 354, the current-repeat bandwidth 352, or a combination thereof for the receiver signal 114 corresponding to the repeat data 124 since it includes the repeat portion 136.

The decoding module 312 can process the receiver signal 114 corresponding to the repeat data 124 as described above. The repeat combining module 322 can combine, further process, or a combination thereof for the repeat portion 136, the content candidate corresponding to the preceding data 126, the preceding data 126, a derivation thereof, a portion therein, or a combination thereof.

For example, the repeat combining module 322 can combine by puncturing, padding with zeros, adding, or a combination thereof for the processing results of the preceding data 126 and the repeat data 124. Also for example, the repeat combining module 322 can decode, error check, or a combination thereof, or have the decoding module 312 decode, error check, or a combination thereof for the combination of the processing results.

The repeat combining module 322 can determine the combination of the processing results as the communication content 108 when the error check is successful. The repeat combining module 322 can start the process for transmitting the repeat request 122 when the combined content candidate fails the error check. The repeat combining module 322 can notify the metric module 320 of the processing results, that another repeated communication is necessary, or a combination thereof.

The receiver calculation module 332 of the metric module 320 can further calculate the next-repeat bandwidth 342 or the repeat metric 130, based on the current-repeat bandwidth 352, the transmission rate 116, the transmission metric 354, or a combination thereof. The receiver calculation module 332 can calculate the next-repeat bandwidth 342 or the repeat metric 130 using Equations (1)-(5) and Equation (6).

It has been discovered that the greedy allocation mechanism using the current-repeat bandwidth 352 and the transmission metric 354 provide increased throughput and efficiency in resource management. The greedy allocation mechanism using the current-repeat bandwidth 352 and the transmission metric 354 can determine sufficient amount of repeat information as necessary to determine the communication content 108 instead of using arbitrary amounts regardless of the situation. The remaining portions can be used to communicate new information, which can improve the overall throughput and efficiency.

The modules described in this application can be hardware implementation or hardware accelerators, including passive circuitry, active circuitry, or both, in the first control unit 216 or in the second control unit 238. The modules can also be hardware implementation or hardware accelerators, including passive circuitry, active circuitry, or both, within the first device 102 or the second device 106 but outside of the first control unit 216 or the second control unit 238, respectively.

The communication system 100 has been described with module functions or order as an example. The communication system 100 can partition the modules differently or order the modules differently. For example, the functions of the encoding module 304 and the repeat module 318 can be combined. Also for example, the control processing module 328 can be separate from and following the channel estimation module 310.

For further example, the metric module 320 can be implemented differently using the first device 102, the second device 106, or a combination thereof. As a more specific example, the receiver calculation module 332 can determine the repeat metric 130 at the first device 102 as a simple metric, such as capacity information, included in the feedback data 346 according to a format predetermined by the communication system 100. The transmission allocation module 334 can generate the allocation portion 132 at the second device 106 for allocating bandwidth.

The physical transformation from the next-capacity 340 and the next-repeat bandwidth 342 results in the movement in the physical world, such as content displayed or recreated for the user on the first device 102. The content, such as navigation information or voice signal of a caller, reproduced on the first device 102 can influence the user's movement, such as following the navigation information or replying back to the caller. Movement in the physical world results in changes to the transmitter channel 112, which can be fed back into the communication system 100 to process the receiver signal 114.

Figure 4:
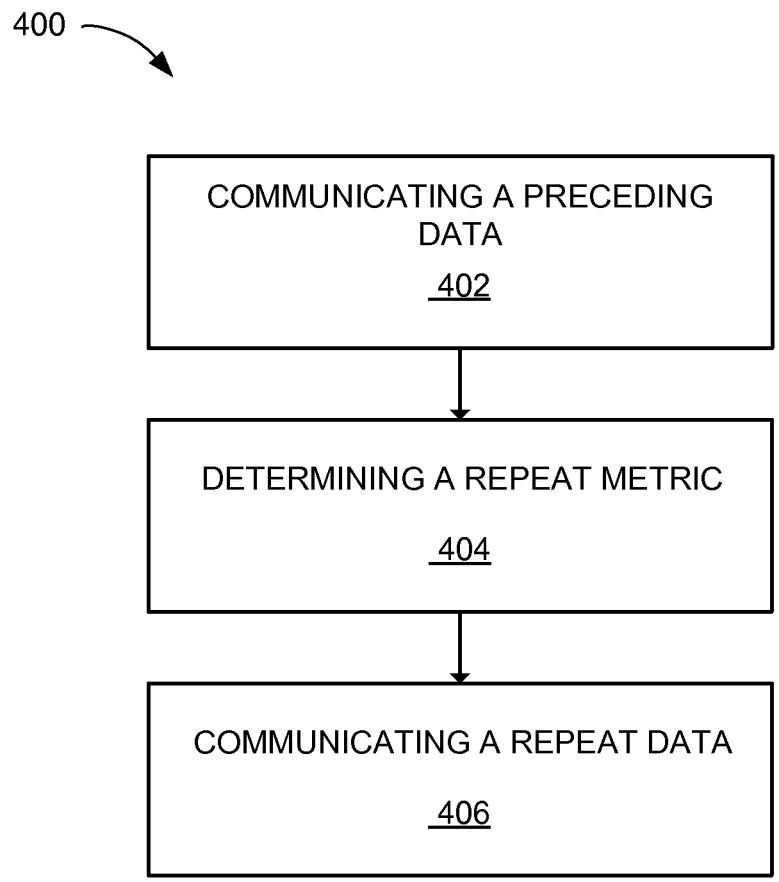
FIG. 4 is a flow chart of a method of operation of a communication system in an embodiment of the present invention.

Referring now to FIG. 4, therein is shown a flow chart of a method 400 of operation of a communication system 100 in an embodiment of the present invention. The method 400 includes: communicating a preceding data before a repeat request in a block 602; determining a repeat metric associated with the repeat request for re-communicating the preceding data or a portion therein in a block 604; and communicating a repeat data including a repeat portion based on the repeat metric for re-communicating the preceding data or a portion therein for communicating with a device in a block 606.

It has been discovered that the repeat metric 130 of FIG. 1, the next-repeat bandwidth 342 of FIG. 3, the allocation portion 132 of FIG. 1 based on the repeat metric 130, provides increased throughput. It has also been discovered that the repeat data 124 of FIG. 1 having the allocation portion 132, the repeat portion 136 of FIG. 1, and the new portion 134 of FIG. 1 therein provides increase in throughput without burdening the resources. It has further been discovered that the heuristic allocation mechanism using the metric adjustment 344 of FIG. 3, and the greedy allocation mechanism using the current-repeat bandwidth 352 of FIG. 3 and the transmission metric 354 of FIG. 3 provide increased accuracy, throughput, and efficiency in resource management for determining the communication content 108.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
    an antenna configured to:
        communicate a preceding data,
        communicate a repeat request subsequent to the preceding data, and
        communicate a repeat data including a repeat portion, a new portion, and an allocation portion within a unit of communication, wherein:
            the allocation portion describing the repeat portion, the new portion, or a combination thereof,
            the repeat portion is based on a repeat metric and for repeating a portion of the preceding data; and
    a control unit, coupled to the antenna, configured to process the repeat metric associated with the repeat request, the repeat metric corresponding to the allocation portion and the repeat portion within the repeat data.

2. The system as claimed in claim 1 wherein:
    the antenna is configured to:
        receive a feedback data after transmitting the preceding data;
        transmit the preceding data and the repeat data; and
    the control unit is configured to process the repeat metric by determining the repeat metric based on the feedback data.

3. The system as claimed in claim 1 wherein the control unit is configured to:
    generate the allocation portion based on the repeat portion;
    determine the repeat portion corresponding to the preceding data based on the repeat metric; and
    generate the repeat data including the allocation portion and the repeat portion therein for transmitting the repeat data.

4. The system as claimed in claim 1 wherein the control unit is configured to:
    determine the repeat portion corresponding to the preceding data based on the repeat metric;
    determine the new portion based on the repeat portion; and
    generate the repeat data including the new portion and the repeat portion therein for transmitting the repeat data.

5. The system as claimed in claim 1 wherein:
    the antenna is configured to receive a feedback data including the repeat request, the feedback data including a representation of a channel estimate processed from the preceding data and the repeat request corresponding to the preceding data; and
    the control unit is configured to process the repeat metric by determining the repeat metric based on the feedback data.

6. The system as claimed in claim 1 wherein:
    the control unit is configured to process the repeat metric by calculating the repeat metric based on the preceding data; and
    the antenna is configured to:
        receive the preceding data, and
        transmit a feedback data based on the repeat metric.

7. The system as claimed in claim 1 wherein the control unit is configured to estimate a next-capacity and to calculate the repeat metric based on the next-capacity.

8. The system as claimed in claim 1 wherein the control unit is configured to:
    determine a current-repeat bandwidth, and a transmission metric based on the preceding data; and
    process the repeat metric by calculating the repeat metric based on the current-repeat bandwidth, and the transmission metric.

9. The system as claimed in claim 1 wherein the control unit is configured to calculate the repeat metric for balancing the repeat portion of the repeat data corresponding to the preceding data.

10. The system as claimed in claim 1 wherein the control unit is configured to generate a feedback data for representing a channel estimate associated with the preceding data, the feedback data including the repeat request and the repeat metric therein with the feedback data requesting the repeat data.

11. A method of operation of a communication system comprising:
    communicating a preceding data;
    communicating a repeat request subsequent to the preceding data;
    communicating a repeat data including a repeat portion, a new portion, and an allocation portion within a unit of communication, wherein:
        the allocation portion describing the repeat portion, the new portion, or a combination thereof, the repeat portion is based on a repeat metric and for repeating a portion of the preceding data; and processing with a control unit the repeat metric associated with the repeat request, the repeat metric corresponding to the allocation portion and the repeat portion within the repeat data.

12. The method as claimed in claim 11 wherein:
communicating the preceding data includes transmitting the preceding data;
processing the repeat metric includes:
  receiving a feedback data after transmitting the preceding data,
  determining the repeat metric based on the feedback data; and
communicating the repeat data includes transmitting the repeat data.

13. The method as claimed in claim 11 further comprising:
determining the repeat portion corresponding to the preceding data based on the repeat metric; and
generating the allocation portion based on the repeat portion.

14. The method as claimed in claim 11 further comprising:
determining the repeat portion corresponding to the preceding data based on the repeat metric; and
determining the new portion based on the repeat portion.

15. The method as claimed in claim 11 further comprising:
receiving a feedback data including the repeat request, the feedback data including a representation of a channel estimate processed from
  the preceding data and the repeat request corresponding to the preceding data;

wherein:
processing the repeat metric includes determining the repeat metric based on the feedback data.

16. The method as claimed in claim 11 wherein:
communicating the preceding data includes receiving the preceding data;
processing the repeat metric includes calculating the repeat metric based on the preceding data; and
further comprising:
  transmitting a feedback data based on the repeat metric.

17. The method as claimed in claim 11 further comprising:
estimating a next-capacity; and
wherein:
processing the repeat metric includes calculating the repeat metric based on the next-capacity.

18. The method as claimed in claim 11 further comprising:
determining a current-repeat bandwidth, and a transmission metric based on the preceding data; and
wherein:
processing the repeat metric includes calculating the repeat metric based on the current-repeat bandwidth, and the transmission metric.

19. The method as claimed in claim 11 wherein processing the repeat metric includes calculating the repeat metric for minimizing the repeat portion of the repeat data corresponding to the preceding data.

20. The method as claimed in claim 11 further comprising determining a feedback data for representing a channel estimate associated with the preceding data, the feedback data including the repeat request and the repeat metric therein with the feedback data requesting the repeat data.

* * * * *